Aug. 5, 1941.  E. J. DILLMAN  2,251,441
VALVE
Filed Feb. 1, 1937
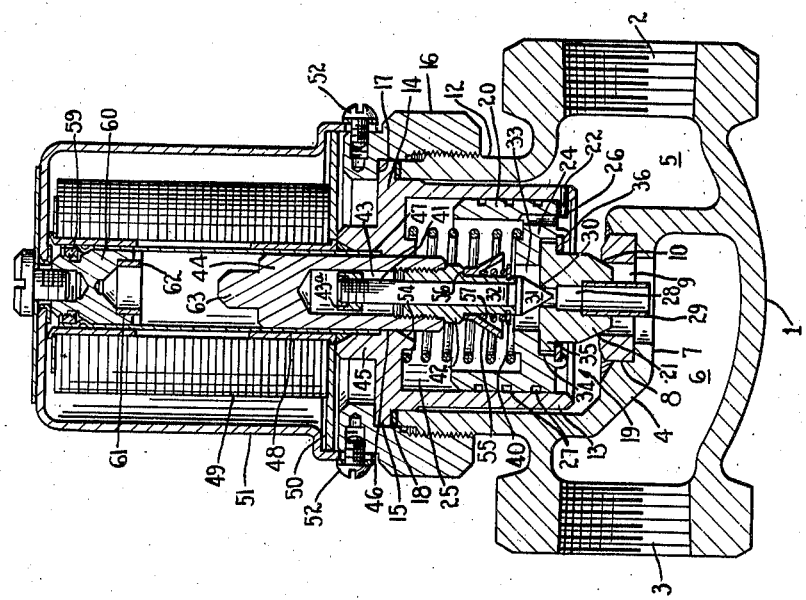
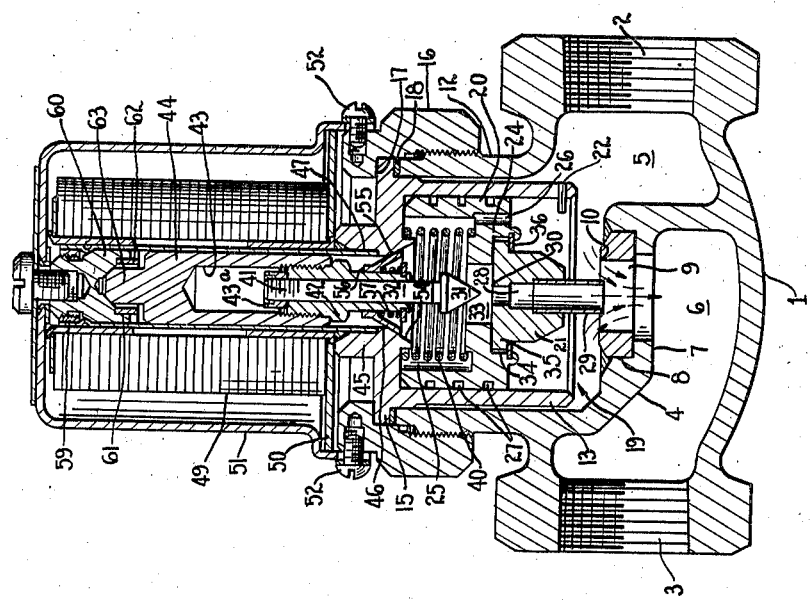
INVENTOR
Earnest J. Dillman
BY
Andrew K. Foulds
ATTORNEY Patented Aug. 5, 1941

2,251,441

UNITED STATES PATENT OFFICE 2,251,441

VALVE

Earnest J. Dillman, Detroit, Mich., assignor to Detroit Lubricator Company, Detroit, Mich., a corporation of Michigan Application February 1, 1937, Serial No. 123,350

5 Claims. (Cl. 137—139)

My invention relates generally to valves and more particularly to solenoid valves.

One of the objects of my invention is to provide a new and improved solenoid valve.

Another object of my invention is to provide a new and improved combination solenoid and fluid pressure operated valve having its mechanism removable as a unitary structure to facilitate assembly and/or disassembly of the device.

Another object of my invention is to provide a solenoid valve having new and improved means for preventing side movement of the solenoid operated valve.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a view in vertical central cross section of our improved solenoid valve shown in closed position, and Fig. 2 is a view similar to Fig. 1 showing the valve in open position.

Referring to the drawing, my valve includes a casing or body 1 provided with an inlet 2 and an outlet 3 for fluid, the inlet and outlet being oppositely disposed, in the present instance. Between the inlet 2 and the outlet 3 the body 1 has an internal wall 4 that divides the interior of the body into an inlet side or chamber 5, and an outlet side or chamber 6. The internal wall 4 has a substantially horizontally disposed portion 7 provided with an aperture in which a valve seat member 8 may be fitted and rigidly secured to the wall. The valve seat member 8 has an aperture or bore 9 therethrough providing a passage for fluid from the inlet 2 to the outlet 3, and providing a port and upwardly facing valve seat 10. In the present device the port 10 may be termed the main port connecting the inlet 2 and outlet 3.

Overlying and substantially registering with the seat or port 10 the body 1 has an upwardly extending, external tubular boss 12 the upper end of which is open, and positioned in the boss 12 and closing the open end thereof there is a removable, tubular or hollow cylindrical member 13. The lower end of the cylindrical member 13 is open and overlies and substantially registers with the valve seat 10 while the upper end of the cylindrical member preferably has a transverse wall 14, integral with which there is preferably an outwardly extending annular flange 15 that seats on the upper end of the tubular boss portion 12 of the valve body 1. Adjacent its upper end the hollow boss 12 may be externally threaded to receive a nut 16 for rigidly securing the cylindrical member 13 to the body 1. The nut 16 may be provided with an internal, downwardly facing annular shoulder 17 for seating on the upper surface of the flange 15, and between the flange and the upper end of the body 1 there is preferably provided a gasket 18 to insure a fluid tight connection between the body 1 and cylindrical member 13.

Carried by and removable with the cylindrical member 13 there is a fluid pressure responsive valve member, designated in general by the numeral 19, that controls the main port 10 and thus may be termed the main valve. The main valve 19 is of sectional construction having a piston or plunger portion 20 and a valve face member 21. The piston portion 20 is disposed for sliding reciprocal movement in the cylindrical member 13 and the valve face member 21 depends from the piston, overlying and substantially registering with the port 10. In order that the piston 20 may be removable with its cylindrical member 13 as a unitary structure, the cylindrical member may be provided with an abutment such as a pin 22 for engaging the piston 20. The pin 22 may be secured in and to the side wall of the cylindrical member 13 and may project into the cylindrical member below the lower end of the piston 20, the pin being arranged such that it will not engage with the piston when the valve 19 and piston 20 are assembled in operative position in the casing 1. Preferably the valve face member 21 is of frustro-conical form, as shown.

The piston 20 is preferably hollow having its upper end open and having its lower end closed by a transverse wall 24 which constitutes the head of the piston and to which head the valve face member 21 is laterally movably attached. The piston 20 co-operates with the cylindrical member 13 to provide, above the piston, a fluid pressure chamber 25. When the valve is seated or closed, as shown in Fig. 1, fluid pressure on opposite sides of the piston head 24 is to be equal, and to this end a by-pass or flow restricting passage or bore 26 is provided, preferably through the piston head 24, communicatively connecting inlet chamber 5 and the pressure chamber 25. If desired, the outer surface of the piston 20 may be provided with a plurality of vertically spaced, circumferential slots or recesses 27 for receiving the fluid, which may be oil, to provide a good seal between the outer piston wall surface and the inner wall surface of the cylindrical member 13.

Extending centrally and longitudinally through the valve face member 21 there is a fluid flow passage 28 that registers with the bore 9 of the valve seat member 8, and preferably extends into the bore 9 when member 21 is seated. The passage 28 may be a bore or it may be a number of aligned bores of different diameter, as shown, and this passage is preferably of larger flow capacity than the by-pass passage 26, for a purpose hereinafter described. Preferably the passage 28 is extended downwardly by a tube or conduit 29 such that when the valve is open, as shown in Fig. 2, the lower end of the conduit 29 will be in close proximity to or within port 10. The tube 29 may have an end portion inserted in the passage 28 and which may be press fitted therein, or otherwise suitably rigidly secured to the face member 21. The passage 28 provides a port and upwardly facing seat 30 for cooperation with the conical face 31 of an electrically or solenoid operated, reciprocal valve member 32 that controls flow through the passage 28 and in so doing controls operation of the main valve 19 by the fluid pressure, as will later be seen. Through the piston head 24 there is provided a centrally disposed aperture or bore 33 in axial alignment with passage 28 for receiving the valve member 32. It will be seen that when the valve member 32 is moved away from its seat 30 the pressure chamber 25 will be in open communication with the outlet chamber 6. The purpose of having the lower end of the tube 29 in close proximity to or slightly within the main port 10 is to obtain an aspiratory action to augment flow from passage 28 by the liquid discharging from the relatively larger main port 10, whereby to obtain a low pressure in chamber 25 when the valves are open.

A counterbore 34 is preferably provided in the lower end of the piston head 24, and the valve face member 21 preferably has a head or external annular flange 35 at its upper end that is positioned in the counterbore 34. Surrounding the valve face member 21 there is a ring 36 in the form of a washer that is secured to the piston 20 and seats against the underside of the valve face member flange 35 to attach the valve face member 21 to the piston. The ring or washer 36 may have an outer border portion thereof secured in an annular recess in the piston head 24 by peening over an extended portion of the piston head. The valve face member head 35 is of less diameter than the piston head bore 33, and the diameter of the valve face member 21 is less than the inner diameter of the washer 36. This sectional construction of parts, and manner of connecting the valve face member 21 to the piston 20, permits of slight lateral or side movement of the member 21 relative to the piston 20 whereby member 21 will adjust or align itself with respect to the valve seat 10 and valve face 31.

Surrounding the valve member 32, within the pressure chamber 25, there is provided a helical coil spring 40 having one end abutting the inner surface of the piston head 24 and the other end abutting the inner surface of the transverse wall of the piston cylinder. The spring 40 is under compression and acts to move the piston downward to move the main valve 19 toward its seat when the pressure in chamber 25 is increased to a predetermined pressure after valve 32 has closed port 10.

The valve member 32 has a vertically extending stem 41 slidably received in an elongated tubular member 42 that may have an upper end portion screw threaded partway into a longitudinally extending bore 43 in an elongated, vertically extending armature 44. An upper end portion of the valve stem 41 extends into the armature bore 43 and has a head 43ª within the bore for engagement with the upper end of the tubular member 42 when the armature 44 has been moved upward a predetermined distance. The transverse wall 14 of the cylindrical member 13 preferably has a centrally disposed, upwardly directed, extended portion or boss 45 provided with a bore 46 for slidably receiving the armature 44. The bore 46 preferably has a slightly enlarged bore portion 47 running out of the upper end of boss 45 to receive an end portion of a tube 48 which, with bore 46, provides a cylindrical guideway for the reciprocal armature 44. The tube 48 extends upwardly above the boss 45, and surrounding the tube there is an electro-magnet coil 49. The coil 49 may be supported on a plate 50 which in turn may be supported on the upper end of the boss 45. Preferably a cap or casing 51 is provided for enclosing the magnet, and may be secured by screws 52 to the nut 16.

At its lower end the bore 46 is flared or beveled around its periphery, providing a socket or recess 54 for receiving a tapered or flared member 55 that is movable with the valve member 32. The valve member 32 is movable relative to the member 55, or has a continued movement after member 55 engages in the socket or recess 54. The purpose of the socket 54 and cooperable member 55 is to prevent side or lateral movement of the valve 32 and associated moving parts. The member 55 is preferably an open ended tubular member that surrounds and is slidably received by the tubular member 42. The upper end of member 55 is adapted to engage or abut an external flange 56 of member 42 when the valve 32 is seated, and the member 55 is urged against the flange 56 by a helical coil spring 57. Adjacent its upper end the member 55 flares outwardly and downwardly, and its outer surface is preferably conical to conform to the socket 54. The coil spring 57 surrounds the tubular member 42 within member 55 and has its upper end bearing against an internal shoulder of member 55 and its lower end bearing against an external annular flange of the valve member 32. Rigidly secured in the guide tube 48 adjacent the upper end thereof, there is a supporting member preferably an internally threaded tubular member or nut 59 that carries an adjustable, cylindrical or socket member 60 within the guide tube 48. The member 60 preferably has a reduced upper end portion screw threaded into the supporting member 59 and has a lower end portion which fits snugly in the guide tube 48. In its lower end the member 60 has a recess in the form of a bore 61, and press fitted or otherwise rigidly secured in the bore 61 there is a band or open ended tubular member 62 preferably formed of copper. An upper end portion of the armature 44 is reduced, as at 63, and is adapted to be positioned within the copper band or tubular member 62 when the armature is held up by the electro-magnet. The purpose of having the armature portion 63 position in the band 62 upon energization of the electro-magnet, is to set up between these parts a different and opposing flux than that set up in the electro-magnet, which results in preventing reciprocation of the armature 44 that would otherwise occur where alternating current is used.

The operation of the herein described solenoid valve is as follows: When the electro-magnet is deenergized, the movable or operating parts of the valve 19 will assume the positions shown in Fig. 1 with valves 19 and 32 both seated. Fluid which may be liquid will flow from the inlet chamber 5 through the by-pass 26 into the pressure chamber 25, and the liquid pressure in chamber 25 acting to move the piston 20 downward, will be equal to the liquid pressure in the inlet chamber 5 acting to move the valve 19 away from its seat 10. The force exerted by the liquid pressure in chamber 25 acting against the piston head 24, together with the force exerted by spring 40, exceeds the force exerted by the liquid acting against the underside of the piston head 24 when the valve 19 is closed, and thus holds the valve in closed position on its seat 10. When the electro-magnet is energized the solenoid armature 44 will be lifted and upon predetermined movement of the armature the valve 32 will be lifted or moved away from its seat 30. After predetermined upward movement of the armature 44, the member 55 will engage in the socket 54 which will, of course, prevent further upward movement of member 55. The armature 44 and member 42, however, will have continued movement after member 55 engages in its socket 54, with the result that the spring 57 will be placed under a greater compression force. The spring 57 will hold the member 55 in tight frictional engagement with the socket 54 which will tend to prevent side or lateral movement of the valve 32 and associated moving parts. When the port 30 is opened, liquid will flow out through passage 28 to the outlet chamber 6 at a greater rate than liquid will flow through by-pass 26 into chamber 25, with the result that the pressure in chamber 25 will be lowered. The passage 28 is preferably of larger flow capacity than the by-pass 26 so as to have the minimum operating pressure difference between the outlet 3 and the inlet 2 as low as possible. When the fluid pressure in chamber 25 has been lowered such that the force of spring 40, plus the force exerted by the liquid pressure in chamber 25 against the piston head 24, becomes less than the force exerted by the liquid in inlet chamber 5 and outlet port 9 acting against their respective portions of the head 24, then the valve 19 will be moved away from its seat to open the main port 10. Also, due to the end of extension tube 29 being at the port 10, the liquid discharging from the port will produce an aspiratory action which will induce discharge from passage 28 at a greater rate and maintain a low pressure in chamber 25. This low pressure will result in the piston 20 being moved upward until it engages wall 14 which serves as its stop, and in this position of the piston the valve 19 will be in a position such that port 10 will be open to full discharge capacity. When the solenoid is again deenergized the armature 44 will descend and move the valve 32 toward and against its seat 30 to stop liquid flow through passage 28. Closing of the passage 28 will result in the pressure increasing in chamber 25 and when the pressure in chamber 25, plus the pressure of the spring 40, exceeds the pressure of the liquid in the inlet side or chamber 5, then the main valve 19 will be seated and all flow through the valve will be stopped.

From the foregoing description it will now be seen that I have provided a new and improved solenoid valve of the type that controls the operation of a main, fluid pressure operated valve member. One of the structural features of my valve resides in the arrangement of parts whereby the solenoid valve controls a flow passage through the main valve. This arrangement provides a compact, simple, efficient mechanism that may be assembled and/or disassembled from the valve body as a unitary structure, which greatly facilitates manufacture of such devices and also facilitates repair or replacement of parts. It will also be seen that I have provided a main valve having a passage controlled by a solenoid valve, and one in which the valve and valve seats are self-aligning to assure proper seating of the valves. Furthermore, in my valve I have provided for increasing the discharge of liquid from the pressure chamber to maintain a low pressure therein by the aspiratory action of the liquid flowing through the main port. In addition I have provided new and improved means for preventing side or lateral movement of the solenoid operated valve and associated moving parts.

What I claim and desire to secure by Letters Patent of the United States is:

1. In a valve of the character described, a valve casing having a passageway therethrough including a valve port, said casing having a hollow extension concentric with said port, said extension opening at one end into said passageway and having its opposite end open, a hollow member having an end wall closing said opposite open end and having a depending side wall defining a pressure chamber, a piston member reciprocal in and fitting within said chamber, said piston member having a surrounding flange directed toward said end wall and engageable therewith to limit movement of said piston member, said end wall having an aperture therethrough concentric with said valve port and having a downwardly opening socket, a valve member carried by said piston member and controlling flow through said valve port, said valve member having a passageway therethrough establishing communication between said chamber and the outlet side of said valve port, a valve member reciprocal in said aperture and controlling said valve member passageway, means carried by said last-named valve member and acting when said last-named valve member is in full open position to engage said socket to prevent lateral movement of said last-named valve member, a helical coil spring within said chamber and said flange and held under compression between said end wall and said piston member, and means establishing communication between the inlet side of said valve port and said chamber.

2. In a valve of the character described, a valve casing having a passageway therethrough with an inlet and an outlet and including a valve port, a pressure responsive member in said passageway and movable toward and from said port, said member having an aperture therethrough, an annular valve member having its opening registering with said aperture and held in seating engagement with said responsive member, said valve member having an outer peripheral portion cooperable with the marginal edge of said port, means to supply fluid pressure to said responsive member to hold said valve member in closed position, and a valve member movable through said aperture and engaging said annular valve member to control flow through said valve member opening so that the fluid pressure on said responsive member can be relieved.

3. In a valve of the character described, a valve casing having a passageway therethrough with an inlet and an outlet and including a valve port, said casing having a chamber, a tubular member substantially fitting said chamber and operable for longitudinal reciprocal movement therein, said tubular member having an end wall closing one end thereof, said end wall having an aperture therethrough and having a passageway therethrough separate from said aperture, an annular valve member having its opening registering with said aperture and held in seating engagement with said end wall, said valve member having an outer peripheral portion cooperable with the marginal edge of said port, said end wall passageway being operable to supply fluid pressure to said chamber on the side of said end wall away from said valve member so that said fluid pressure will act on said end wall to hold said valve member in closed position, and a valve member movable through said aperture and engaging said annular valve member to control flow through said valve member opening so that said fluid pressure acting on said end wall can be relieved.

4. In a valve of the character described, a valve casing having a passageway therethrough with an inlet and an outlet and including a valve port, a pressure responsive member in said passageway and movable toward and from said port, said member having an aperture therethrough aligned with said valve port, said pressure responsive member having a recess concentric with said aperture in the surface of said responsive member adjacent said valve port, an annular valve member having its opening registering with said aperture, said annular valve member having a flange portion at one end portion thereof, said flange portion being received and being laterally freely movable within said recess, means secured to said pressure responsive member adjacent said recess and cooperable with said annular valve member thereby to hold said annular valve member in seating engagement with said responsive member, said valve member having at its other end portion an outer peripheral portion cooperable with the marginal edge of said port, means to supply fluid pressure to said responsive member to hold said valve member in closed position, and a valve member movable through said aperture and engaging said annular valve member to control flow through said valve member opening so that the fluid pressure on said responsive member can be relieved.

5. In a valve structure, a valve casing, a tubular member having a side wall and an end wall closing one end, means for securing said end wall to the valve casing so that said tubular member is rigidly held thereto with said side wall spaced from the valve casing, a piston member having a piston fit with said side wall and reciprocal within said tubular member, said piston member having an end wall spaced from said tubular member end wall, a valve member carried by said piston member end wall and operable to extend beyond said side wall, resilient means under stress and positioned between said end walls and operable to urge said end walls in opposite directions, and means carried by said side wall and operable to be engaged by said piston member end wall to hold said piston member within said tubular member upon removal of said tubular member from the valve casing.

EARNEST J. DILLMAN.